(12) United States Patent
Zwisler

(10) Patent No.: US 8,478,934 B2
(45) Date of Patent: Jul. 2, 2013

(54) MANAGING EXTENDED RAID CACHES USING COUNTING BLOOM FILTERS

(75) Inventor: Ross E Zwisler, Lafayette, CO (US)

(73) Assignee: LSI Corporation, Milpitas, CA (US)

( * ) Notice: Subject to any disclaimer, the term of this patent is extended or adjusted under 35 U.S.C. 154(b) by 344 days.

(21) Appl. No.: 12/838,547

(22) Filed: Jul. 19, 2010

(65) Prior Publication Data

US 2012/0017041 A1 Jan. 19, 2012

(51) Int. Cl.
*G06F 7/00* (2006.01)
*G06F 12/02* (2006.01)
*G06F 17/30* (2006.01)

(52) U.S. Cl.
USPC ............ 711/113; 711/114; 711/E12.017; 711/E12.103; 707/803; 707/E17.044

(58) Field of Classification Search
None
See application file for complete search history.

(56) References Cited

U.S. PATENT DOCUMENTS

| | | | |
|---|---|---|---|
| 2005/0216669 A1* | 9/2005 | Zhu et al. | 711/154 |
| 2007/0174321 A1* | 7/2007 | Viikari et al. | 707/102 |
| 2007/0260602 A1* | 11/2007 | Taylor | 707/6 |
| 2009/0031082 A1 | 1/2009 | Ford et al. | |
| 2009/0183159 A1* | 7/2009 | Michael et al. | 718/101 |
| 2010/0030840 A1 | 2/2010 | O'Shea et al. | |
| 2010/0106691 A1 | 4/2010 | Preslan et al. | |
| 2010/0299727 A1* | 11/2010 | More et al. | 726/5 |
| 2011/0219205 A1* | 9/2011 | Wright | 711/206 |
| 2011/0307447 A1* | 12/2011 | Sabaa et al. | 711/108 |

OTHER PUBLICATIONS

Kantarcioglu, Murat, R. Nix, and J. Vaidya, "An Efficient Approximate Protocol for Privacy-Preserving Association Rule Mining," Pacific-Asia Knowledge Discovery and Data Mining (PAKDD) 2009, Lecture Notes in Artificial Intelligence (LNAI) vol. 5476, pp. 515-524, Springer, 2009.*
Jih-Kwon Peir, et al.; Bloom Filtering Cache Misses for Accurate Data Speculation and Prefetching; Copyright 2002 ACM; Jun. 22-26, 2002; 10 pages; ICS '02; New York, New York.

* cited by examiner

*Primary Examiner* — Reginald Bragdon
*Assistant Examiner* — Daniel Bernard
(74) *Attorney, Agent, or Firm* — Suiter Swantz pc llo

(57) ABSTRACT

Contentual metadata of an extended cache is stored within the extended cache. The contentual metadata of the extended cache is approximated utilizing a counting Bloom filter. The counting Bloom filter is stored within a primary cache. Contentual metadata of the primary cache is stored within the primary cache. One of a data read or a data write is executed without accessing the contentual metadata of the extended cache stored within the extended cache.

12 Claims, 4 Drawing Sheets

MANAGING EXTENDED RAID CACHES USING COUNTING BLOOM FILTERS

TECHNICAL FIELD

The present disclosure generally relates to the field of disk array controllers, and more particularly to a system, method, and device for a Redundant Array of Independent Disks (RAID) controller utilizing a primary cache and an extended cache.

BACKGROUND

Disk array controllers are a technology for managing disk drives and presenting the disk drives as logical units to a computer system. A Redundant Array of Independent Disks (RAID) controller is a disk array controller for a RAID array. RAID controllers often include disk cache to reduce access times to the RAID array. Storage technologies have progressed so that it is logical to provide multiple tiers of cache in RAID controllers. RAID controllers may now include an extended cache in addition to the primary cache. The primary cache typically has faster access times and has a lower capacity than the extended cache.

SUMMARY

A method for managing data within a Redundant Array of Independent Disks (RAID) array utilizing a RAID controller including an extended cache, may include, but is not limited to storing contentual metadata of the extended cache within the extended cache, approximating contentual metadata of the extended cache utilizing a counting Bloom filter, storing the counting Bloom filter within a primary cache, storing contentual metadata of the primary cache within the primary cache and executing one of a data read or a data write without accessing the contentual metadata of the extended cache stored within the extended cache, wherein a first data set is not stored within the primary cache, the first data set associated with a location of the RAID array addressed by at least one of the data read or the data write.

A system for managing data within a RAID array utilizing a primary cache and an extended cache may include, but is not limited to means for storing contentual metadata of the extended cache within the extended cache, means for approximating contentual metadata of the extended cache utilizing a counting Bloom filter, means for storing the counting Bloom filter within a primary cache, means for storing contentual metadata of the primary cache within the primary cache, means for utilizing the contentual data of the primary cache stored within the primary cache to determine one of a presence or an absence of a data set within the primary cache upon receiving a request for at least one of a data read or a data write, wherein the data set corresponds with a location of the RAID array addressed by at least one of the data read or the data write, and means for utilizing the counting Bloom filter to determine one of a presence of an absence of the data set within the extended cache upon determining the absence of the data set within the primary cache.

A RAID controller for management of a RAID array may include, but is not limited to an extended cache for storing a first data set of the RAID array including contentual metadata of the extended cache, a primary cache communicatively coupled to the extended cache for storing a second data set of the RAID array including contentual metadata of the primary cache and approximated contentual metadata of the extended cache, wherein the approximated contentual metadata is formatted as a counting Bloom filter, and a processor communicatively coupled to the primary cache and the extended cache for operation of the RAID controller.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
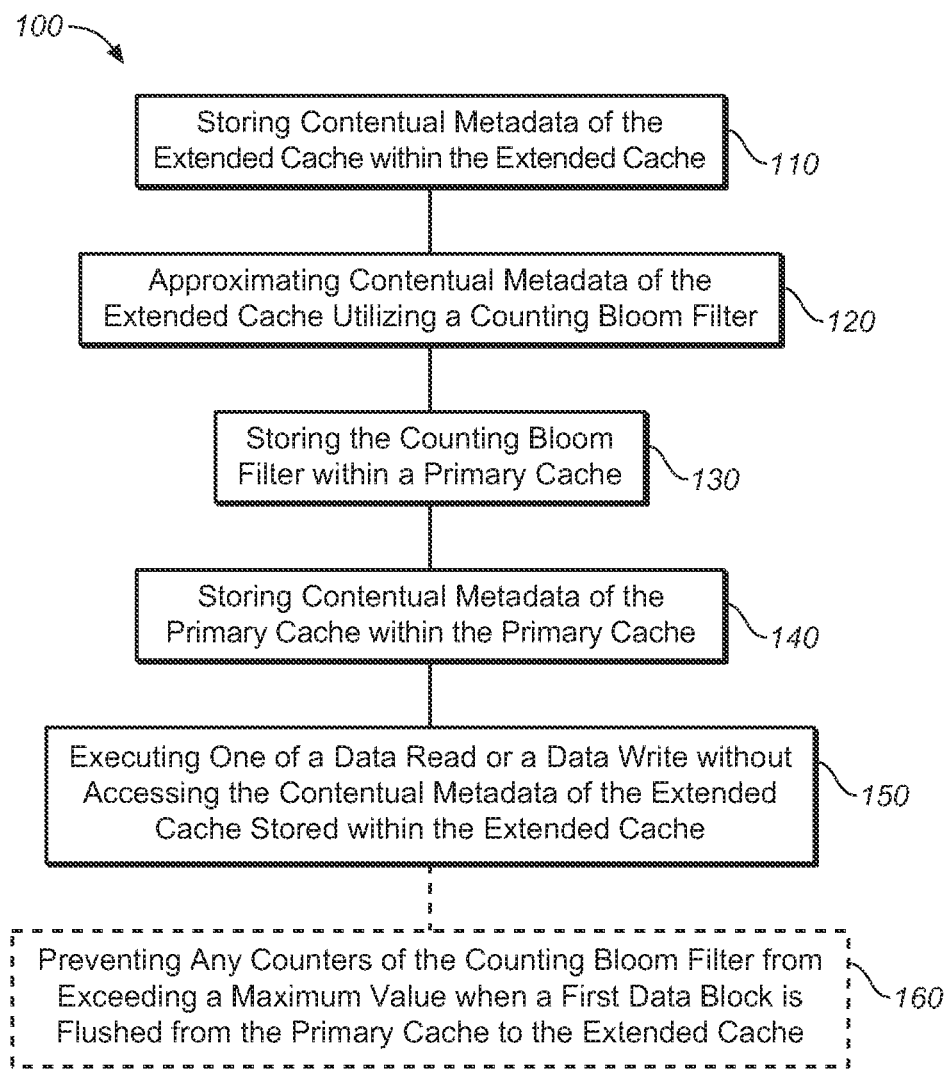
FIG. 1 is a flow diagram illustrating a method for managing data within a RAID array utilizing a RAID controller including an extended cache.

Referring generally to FIG. 1, a method for managing data within a RAID array utilizing a RAID controller including an extended cache is shown. The method 100 may include the step of storing contentual metadata (ex—data for tracking the contained data) of the extended cache within the extended cache 110. The contentual metadata of the extended cache may include an address within the RAID array for each data block of the RAID array stored within the extended cache. Contentual metadata may store information monitoring the current utilization of data blocks within the caches of the RAID controller. Further, the contentual metadata may store information monitoring the location of the RAID array data segments currently stored within various cache blocks. In addition, the contentual metadata may store information monitoring the cache blocks storing data which has changed subsequent to being stored within the cache blocks.

The method 100 may further include the step of approximating contentual metadata of the extended cache utilizing a counting Bloom filter 120. Bloom filters are an efficient data management technique for tracking data set membership. Counting Bloom filters are a subset of Bloom filters with the additional capability of removing a data set from the Bloom filter. The counting Bloom filter may be approximated from the contentual metadata of the extended cache. In another embodiment, the counting Bloom filter may be approximated directly from the data contents of the extended cache.

The method 100 may further include the step of storing the counting Bloom filter within a primary cache 130. The method 100 may further include the step of storing contentual metadata of the primary cache within the primary cache 140. The method 100 may further include the step of executing one of a data read or a data write without accessing the contentual metadata of the extended cache stored within the extended cache 150. The data set associated with the location (ex—

RAID array location) addressed by one of the data read or the data write may not be stored within the primary cache 140.

The method 100 may further include the step of preventing any counters of the counting Bloom filter from exceeding a maximum value when a first data block is flushed (ex—data from a first location is written to a second location, then the data in the first location is no longer utilized) from the primary cache to the extended cache 160. One or more counters within the counting Bloom filter may increment as a data block is flushed to the extended cache. Preventing any counters of the counting Bloom filter from exceeding a maximum value may include determining whether any of the counters associated with a data block will exceed their respective maximum values when incremented. In an embodiment of the present disclosure, if any counters associated with a data block will exceed a maximum value when incremented, the data block may be discarded from the primary cache if the data block has not changed (ex—the data block has not been written to with different data) subsequent to caching within the primary cache. Further, if any counters will exceed a maximum value when incremented, the data block may be flushed from the primary cache to the RAID array if the data block has changed (ex—the data block has been written to with different data) subsequent to caching within the primary cache (ex—"dirty data").

In an additional embodiment of the present disclosure, one or more counters within the counting Bloom filter may decrement as a data block is removed from the extended cache. In an embodiment of the present disclosure, if any counters will exceed a maximum value when incremented via the flushing of a first data block to the extended cache, preventing any counters of the counting Bloom filter from exceeding a maximum value may include removing a second data block from the extended cache, wherein the set of counters associated with the second data block intersect the set of counters that will exceed a maximum value when incremented associated with the first data block (ex—there are counters in common between the counters that will exceed a maximum value when the first data block is flushed to the extended cache and the counters that will decrement when second data block is removed from the extended cache). Further removing of data blocks from the extended cache may continue until every counter that will exceed a maximum value when flushing the first data block to the extended cache and also associated with the first data block has been decremented via removing data blocks from the extended cache (ex—each of a first set of counters that will exceed a maximum value associated with the first data block have intersected a counter associated with a removed data block). Flushing the first data block from the primary cache to the extended may then occur without any counters of the counting Bloom filter exceeding a maximum value.

Figure 2:
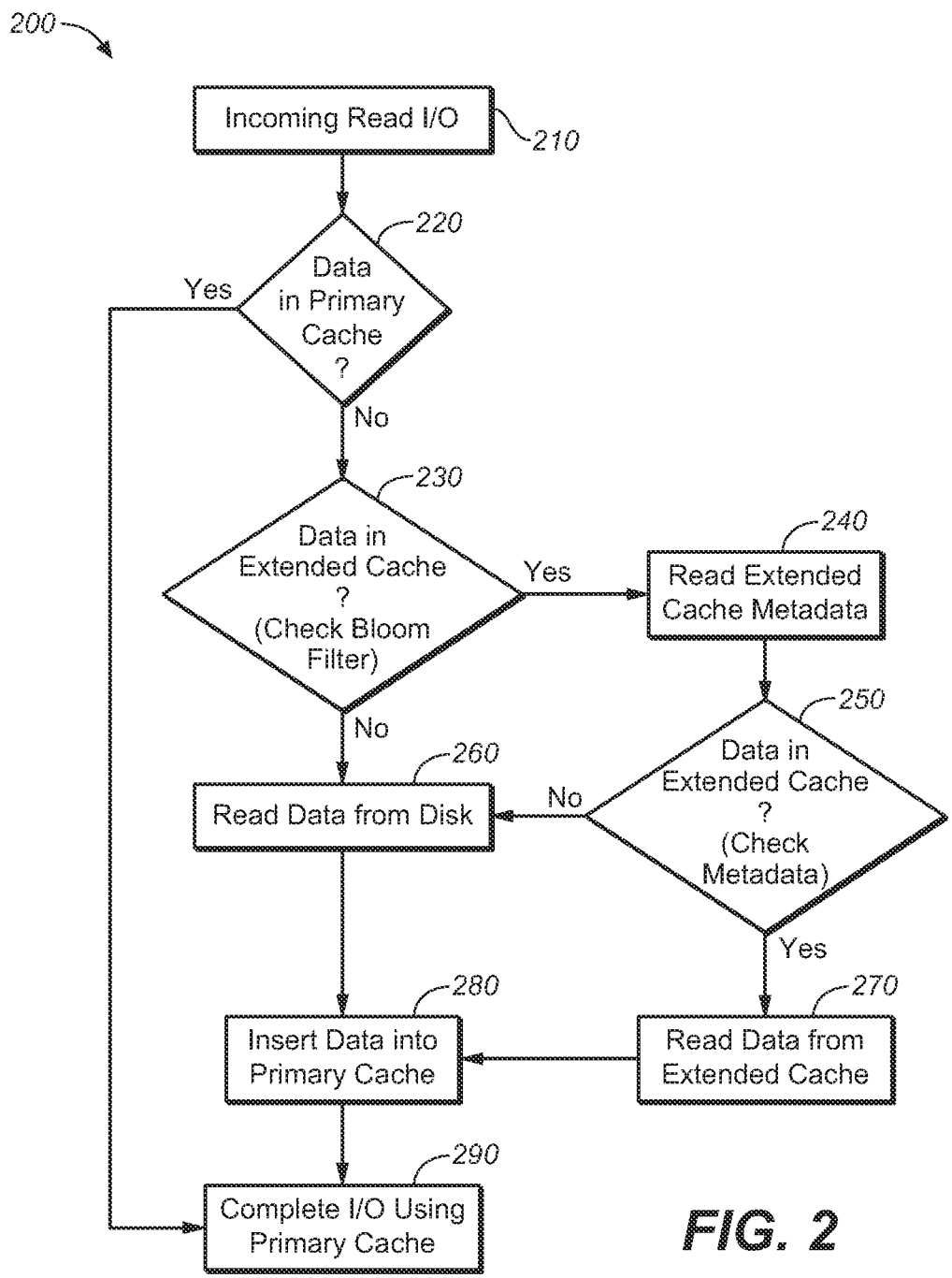
FIG. 2 is a flowchart diagram illustrating a data read from a RAID array utilizing a RAID controller including a primary cache and an extended cache.

Referring generally to FIG. 2, a flowchart illustrating a data read from a RAID array utilizing a RAID controller including a primary cache and an extended cache according to the present disclosure is shown. The data read 200 includes a block 210 representing an incoming data read request to the RAID controller. The incoming data read request may include an address location of the data to be read. The data read 200 may further include a block 220 representing determining the presence or the absence, within the primary cache, of the data associated with the location of the RAID array addressed by the data read. The block 220 may utilize the contentual metadata of the primary cache stored within the primary cache for determining the presence or the absence of the data associated with the location of the RAID array addressed by the data read.

The data read 200 may further include a block 230 representing determining a presence or an absence, within the extended cache, of the data associated with the location of the RAID array addressed by the data read. The block 230 may utilize the counting Bloom filter within the primary cache for determining the presence or the absence. The data read 200 may proceed to block 230 from block 220 upon determining an absence within the primary cache of the data associated with the location of the RAID array addressed by the data read.

The data read 200 may further include a block 240 representing reading the contentual metadata of the extended cache from the extended cache. The data read 200 may proceed to block 240 from block 230 upon determining a presence within the extended cache of the data associated with the location of the RAID array addressed by the data read. The data read 200 may further include a block 250 representing determining a presence or an absence within the extended cache of the data associated with the location of the RAID array addressed by the data read. Block 250 may utilize the contentual metadata of the extended cache from the extended cache for the determination.

The data read 200 may further include a block 260 representing reading the data associated with the location of the RAID array addressed by the data read from the RAID array. The data read 200 may proceed to block 260 from block 230 upon determining an absence within the extended cache of the data associated with the location of the RAID array addressed by the data read. The data read 200 may proceed to block 260 from block 250 upon determining an absence within the extended cache of the data associated with the location of the RAID array addressed by the data read.

The data read 200 may further include a block 270 representing reading the data associated with the location of the RAID array addressed by the data read from the extended cache. The data read 200 may proceed to block 270 from block 250 upon determining a presence within the extended cache of the data associated with the location of the RAID array addressed by the data read. The data read 200 may further include a block 280 representing inserting the data associated with the location of the RAID array addressed by the data read into the primary cache. The data read 200 may proceed to block 280 from block 270. The data read 200 may proceed to block 280 from block 260.

The data read 200 may further include a block 290 representing completing the data read utilizing the data in the primary cache. The data read 200 may proceed to block 290 from block 280. The data read 200 may proceed to block 290 from block 220 upon determining a presence within the primary cache of the data associated with the location of the RAID array addressed by the data read. The data read 200 may execute on a data set not stored within the primary cache without accessing the contentual metadata of the extended cache stored within the extended cache via blocks 210, 220, 230, 260, 280, and 290.

Figure 3:
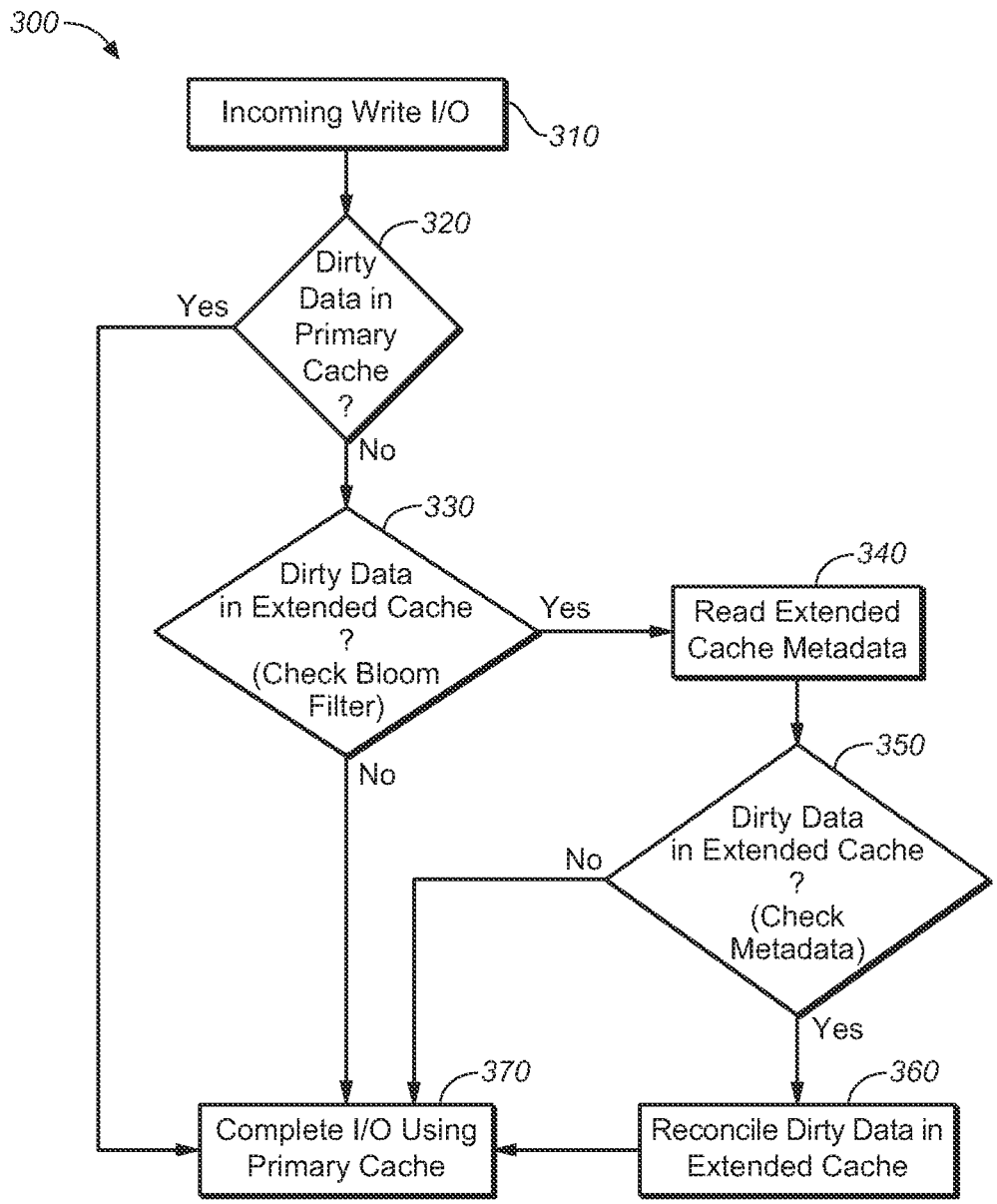
FIG. 3 is a flowchart diagram illustrating a data write to a RAID array utilizing a RAID controller including a primary cache and an extended cache.

Referring generally to FIG. 3, a flowchart illustrating a data write to a RAID array utilizing a RAID controller including a primary cache and an extended cache according to the present disclosure is shown. The data write 300 includes a block representing an incoming data write request to the RAID controller 310. The incoming data write request may include an address location of the data to be written. Further, the incoming data write request may include the data to be written. The data write 300 may further include a block 320 representing determining the presence or the absence within the primary cache of dirty data associated with the location of the RAID array addressed by the data write. Dirty data may be defined as data within a cache which has changed subsequent to storage within the cache. The block 320 may utilize the contentual metadata of the primary cache stored within the primary cache for determining the presence or the absence.

The data write 300 may further include a block 330 representing determining a presence or an absence within the extended cache of dirty data associated with the location of the RAID array addressed by the data write. The block 330 may utilize the counting Bloom filter stored within the primary cache for determining the presence or the absence. The data write 300 may proceed to block 330 from block 320 upon determining an absence within the primary cache of dirty data associated with the location of the RAID array addressed by the data write.

The data write 300 may further include a block 340 representing reading the contentual metadata of the extended cache from the extended cache. The data write 300 may proceed to block 340 from block 330 upon determining a presence within the extended cache of dirty data associated with the location of the RAID array addressed by the data write. The data write 300 may further include a block 350 representing determining a presence or an absence within the extended cache of dirty data associated with the location of the RAID array addressed by the data write. Block 350 may utilize the contentual metadata of the extended cache stored within the extended cache for the determination.

The data write 300 may further include a block 360 representing reconciling the dirty data in the extended cache associated with the location of the RAID array addressed by the data write to the RAID array. In an embodiment, reconciling the dirty data in the extended cache may include discarding the dirty data if the data to be written fully overwrites the dirty data. Further, reconciling the dirty data in the extended cache may include flushing the dirty data from the extended cache to the primary cache if the data to be written does not fully overwrite the dirty data. The data write 300 may proceed to block 360 from block 350 upon determining a presence within the extended cache of dirty data associated with the location of the RAID array addressed by the data write.

The data write 300 may further include a block 370 representing completing the data write utilizing the data in the primary cache. Completing the data write may include merging the data to be written with the dirty data within the primary cache associated with the location of the RAID array addressed by the data write if the data to be written does not fully overwrite the dirty data flushed to the primary cache. Further, completing the data write may include writing the data to be written to the primary cache. The data write 300 may proceed to block 370 from block 360. The data write 300 may proceed to block 370 from block 320 upon determining a presence within the primary cache of dirty data associated with the location of the RAID array addressed by the data write. The data write 300 may proceed to block 370 from block 330 upon determining an absence within the extended cache of dirty data associated with the location of the RAID array addressed by the data write. The data write 300 may proceed to block 370 from block 350 upon determining an absence within the extended cache of dirty data associated with the location of the RAID array addressed by the data write. The data write 300 may execute on a data location without dirty data stored in the primary cache without accessing the contentual metadata of the extended cache stored within the extended cache via blocks 310, 320, 330, and 370.

Figure 4:
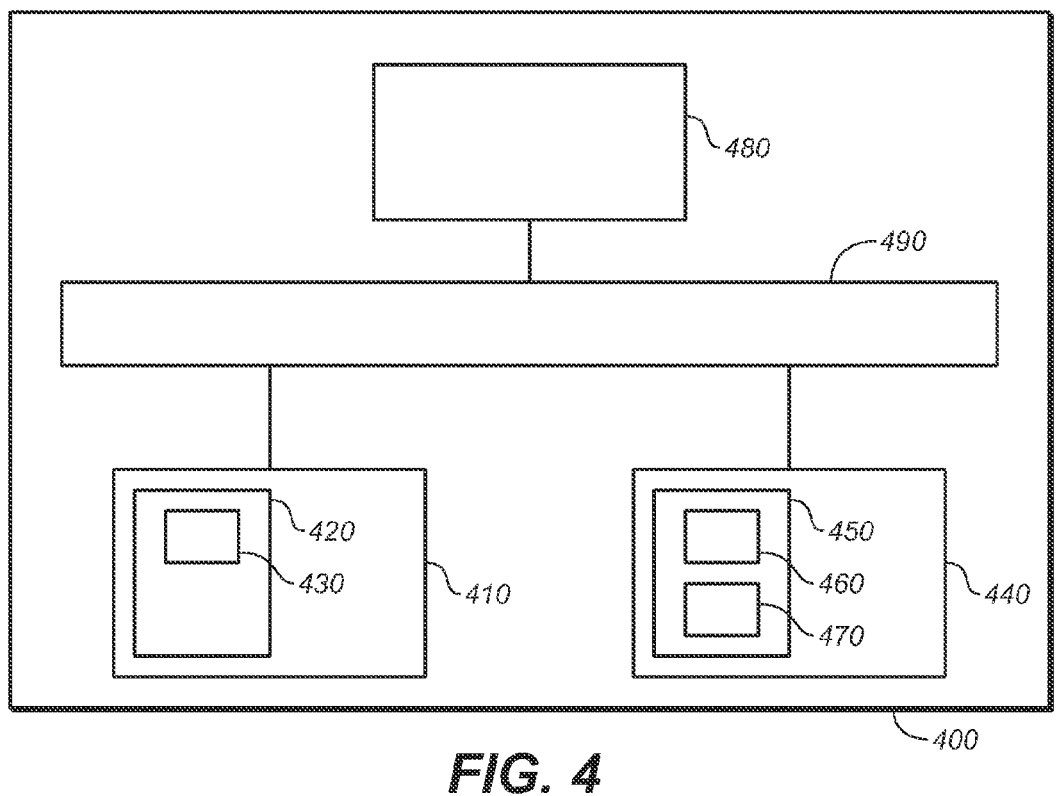
FIG. 4 is a block diagram illustrating a RAID controller including a primary and extended cache.

Referring generally to FIG. 4, a RAID controller configured according to the current disclosure is shown. The RAID controller 400 may be configured to perform the method 100. The RAID controller 400 may further execute data read 200 or data write 300. The RAID controller 400 may include an extended (ex—secondary) cache 410. The extended cache 410 may store a first data set 420 of a RAID array. The first data set 420 may include contentual metadata of the extended cache 430.

The RAID controller 400 may further include a primary cache 440. The primary cache 440 may store a second data set 450 of a RAID array. The second data set 450 may include contentual metadata of the primary cache 460. Further, the second data set may include approximated contentual metadata of the extended cache 470. The approximated contentual metadata of the extended cache 470 stored within the primary cache may be formatted as a counting Bloom filter. The primary cache 440 may be communicatively coupled to the extended cache 410.

The RAID controller 400 may further include a processor 480. The processor 480 may execute instructions operating RAID controller 400. The processor 480 may be communicatively coupled to the extended cache 410. Further, the processor 480 may be communicatively coupled to the primary cache 440. RAID controller 400 may execute one of a data read or a data write without accessing the contentual metadata of the extended cache 430.

The processor 480 may determine a presence or an absence of a data set within the primary cache 440 upon the controller 400 receiving a data read or a data write. In order to perform such a determination, the processor 480 may check the contentual metadata of the primary cache for determining the presence or the absence of the data set within the primary cache. The data set may correspond with a location of the RAID array addressed by the data read or the data write. If the processor 480 determines an absence of the data within the primary cache 440, the processor 480 may then determine the presence or the absence of the data set within the extended cache 410. In order to perform such a determination, the processor 480 may check the approximated contentual metadata of the extended cache 470 stored within the primary cache 440. The approximated contentual metadata of the extended cache 470 may be formatted as a counting Bloom filter. The extended cache 410, primary cache 440, and processor 480 may be communicatively coupled via a bus 490.

In the present disclosure, the methods disclosed may be implemented as sets of instructions or software or firmware readable by a device. Such software may include a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

The form described is merely explanatory, and it is the intention of the following claims to encompass and include such changes.

What is claimed is:

1. A method for managing data within a Redundant Array of Independent Disks (RAID) array utilizing a RAID controller including an extended cache, comprising:
    storing contentual metadata of the extended cache within the extended cache;
    approximating the contentual metadata of the extended cache utilizing a counting Bloom filter;
    storing the counting Bloom filter within a primary cache;
    storing contentual metadata of the primary cache within the primary cache;
    executing one of a data read or a data write without accessing the contentual metadata of the extended cache stored within the extended cache;
    determining one of a presence or an absence of a first data set within the primary cache utilizing the contentual metadata stored within the primary cache upon receiving a request for at least one of the data read or the data write; and
    utilizing the counting Bloom filter to determine one of the presence or the absence of the first data set within the extended cache upon determining the absence of the data set within the primary cache.

2. The method of claim 1, further comprising:
    preventing any counters of the counting Bloom filter from exceeding a maximum value when a first data block is flushed from the primary cache to the extended cache.

3. The method of claim 2, further comprising:
    determining whether at least one counter of the counting Bloom filter associated with the first data block will exceed the maximum value when the first data block is flushed from the primary cache to the extended cache.

4. The method of claim 3, further comprising:
    removing a second data block from the extended cache if any counter of the counting Bloom filter associated with the first data block will exceed the maximum value when the first data block is flushed from the primary cache to the extended cache, wherein removing the second data block will decrement any counter, of the counting Bloom filter associated with the first data block, that will exceed the maximum value when the first data block is flushed from the primary cache to the extended cache.

5. The method of claim 3, further comprising:
    removing a second data block from the extended cache if any counter of the counting Bloom filter associated with the first data block will exceed the maximum value when the first data block is flushed from the primary cache to the extended cache;
    repeating the step of removing until all counters of a first set of counters have intersected a counter associated with a removed data block, wherein the first set of counters includes each counter, of the counting Bloom filter associated with the first data block that will exceed the maximum value when the first data block is flushed from the primary cache to the extended cache; and
    flushing the first data block from the primary cache to the extended cache.

6. A system for managing data within a Redundant Array of Independent Disks (RAID) array utilizing a primary cache and an extended cache, comprising:
    means for storing contentual metadata of the extended cache within the extended cache;
    means for approximating the contentual metadata of the extended cache utilizing a counting Bloom filter;
    means for storing the counting Bloom filter within a primary cache;
    means for storing contentual metadata of the primary cache within the primary cache;
    means for utilizing the contentual metadata of the primary cache stored within the primary cache to determine one of a presence or an absence of a data set within the primary cache upon receiving a request for at least one of a data read or a data write, wherein the data set corresponds with a location of the RAID array addressed by at least one of the data read or the data write; and
    means for utilizing the counting Bloom filter to determine one of the presence or the absence of the data set within the extended cache upon determining the absence of the data set within the primary cache.

7. The system of claim 6, further comprising:
    means for preventing any counters of the counting Bloom filter from exceeding a maximum value when a first data block is flushed from the primary cache to the extended cache.

8. The system of claim 7, further comprising:
    means for determining whether at least one counter of the counting Bloom filter associated with the first data block will exceed the maximum value when the first data block is flushed from the primary cache to the extended cache.

9. The system of claim 8, further comprising:
    means for removing a second data block from the extended cache if any counter of the counting Bloom filter associated with the first data block will exceed the maximum value when the first data block is flushed from the primary cache to the extended cache, wherein removing the second data block will decrement any counter, of the counting Bloom filter associated with the first data block, that will exceed the maximum value when the first data block is flushed from the primary cache to the extended cache.

10. The system of claim 8, further comprising:
    means for removing a second data block from the extended cache if any counter of the counting Bloom filter associated with the first data block will exceed the maximum value when the first data block is flushed from the primary cache to the extended cache;
    means for repeating the step of removing until all counters of a first set of counters have intersected a counter associated with a removed data block, wherein the first set of counters includes each counter, of the counting Bloom filter associated with the first data block that will exceed the maximum value when the first data block is flushed from the primary cache to the extended cache; and
    means for flushing the first data block from the primary cache to the extended cache.

11. A Redundant Array of Independent Disks (RAID) controller for management of a RAID array, comprising:
    an extended cache for storing a first data set of the RAID array including contentual metadata of the extended cache;
    a primary cache communicatively coupled to the extended cache for storing a second data set of the RAID array including contentual metadata of the primary cache and approximated contentual metadata of the extended cache, wherein the approximated contentual metadata is formatted as a counting Bloom filter; and
    a processor communicatively coupled to the primary cache and the extended cache for operation of the RAID controller, the processor configured to determine one of a presence or an absence of a third data set within the primary cache when the RAID controller receives at least one of a data read or a data write, the processor further configured to check the contentual metadata of the primary cache to determine the one of the presence or the absence of the third data set within the primary cache, the processor further configured to determine one of a presence or an absence of the third data set within the extended cache upon determining the absence of the third data set within the primary cache, the processor further configured for checking the counting Bloom filter to determine the one of the presence or the absence of the third data set within the extended cache.

12. The RAID controller of claim 11, wherein the RAID controller executes at least one of a data read or a data write without accessing the contentual metadata of the extended cache.

* * * * *